United States Patent [19]
Hurst

[11] Patent Number: 5,350,182
[45] Date of Patent: Sep. 27, 1994

[54] SHOPPING CART HAVING UNDERCARRIAGE TRAY WITH INTEGRAL BASKET

[75] Inventor: Jack W. Hurst, Wagoner, Okla.

[73] Assignee: UNR Industries, Inc., Chicago, Ill.

[21] Appl. No.: 60,088

[22] Filed: May 10, 1993

[51] Int. Cl.$^5$ ............................................... B62B 3/08
[52] U.S. Cl. ........................... 280/33.996; 280/33.991; 280/33.992
[58] Field of Search ...................... 280/33.991, 33.996, 280/33.997, 33.992, 79.3, 47.26

[56] References Cited

U.S. PATENT DOCUMENTS

| | | | |
|---|---|---|---|
| 2,903,269 | 9/1959 | Hennion | 280/33.996 X |
| 3,026,122 | 3/1962 | Young | 280/33.996 X |
| 3,112,934 | 12/1963 | Buczak | 280/33.991 |
| 3,353,836 | 11/1967 | Davis | 280/33.997 |
| 3,797,861 | 3/1974 | Shoffner | 280/33.996 |
| 4,067,591 | 1/1978 | Celms | 280/33.997 |
| 4,850,604 | 7/1989 | Le Marchand et al. | 280/33.996 |

FOREIGN PATENT DOCUMENTS 1194860 11/1959 France ............................ 280/33.996

OTHER PUBLICATIONS 2-page Brochure, "Unarco CHECKMATE ® 500 Series and 600 Series Over-the-Counter Carts 1500 and 1600 Series, Counter Level Carts", Oct., 1986.

*Primary Examiner*—Margaret A. Focarino
*Assistant Examiner*—Carla Mattix
*Attorney, Agent, or Firm*—Dressler, Goldsmith, Shore & Milnamow, Ltd.

[57] ABSTRACT

For a shopping cart, an undercarriage comprises a tubular frame and a tray, a back portion of which includes an integral basket having a front wall, a back wall, and two side walls. The frame has two lateral portions extending longitudinally between the front and back ends of the undercarriage, at a lower level and a transverse portion extending transversely near the back end of the undercarriage, at a higher level. The tray and the basket are made of welded wires. The back portion is disposed to rest against the transverse portion of the frame in a generally level position of the tray and is elevated in an upwardly tilted position of the tray. At the back portion, one of the wires defines a bail, which extends backwardly so as to overlie the transverse portion of the frame in the generally level position of the tray.

6 Claims, 2 Drawing Sheets

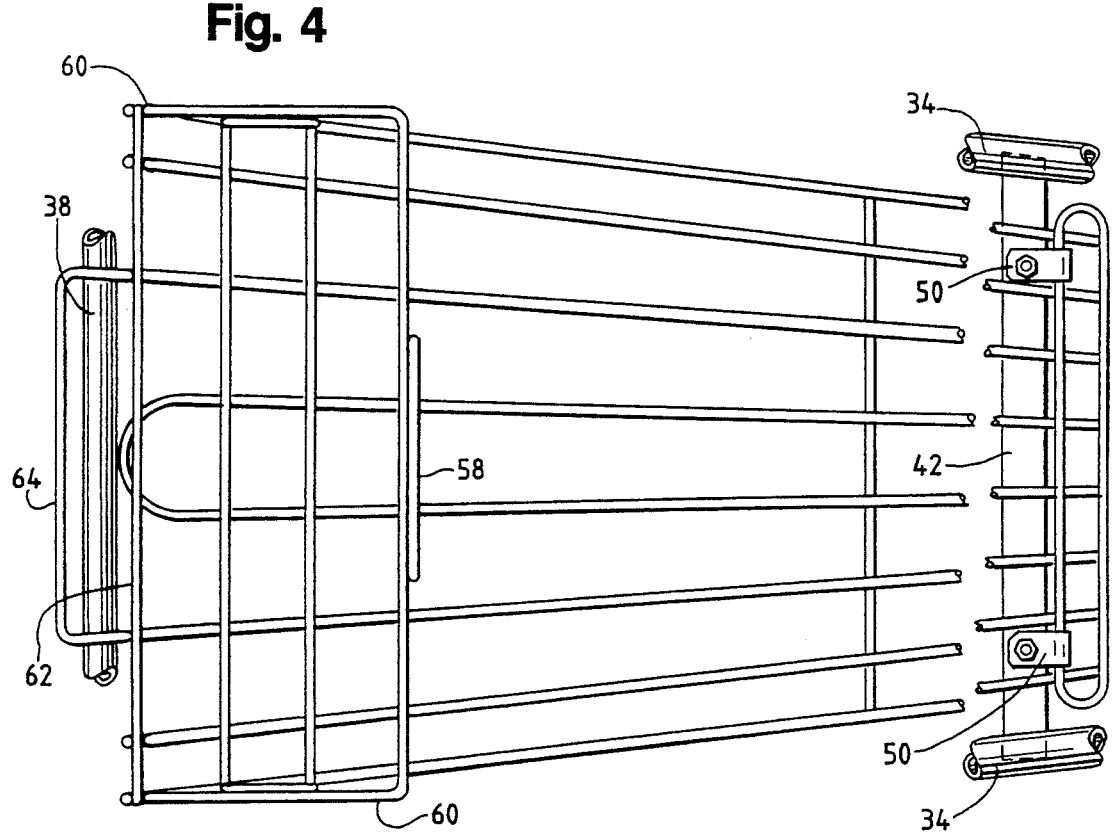
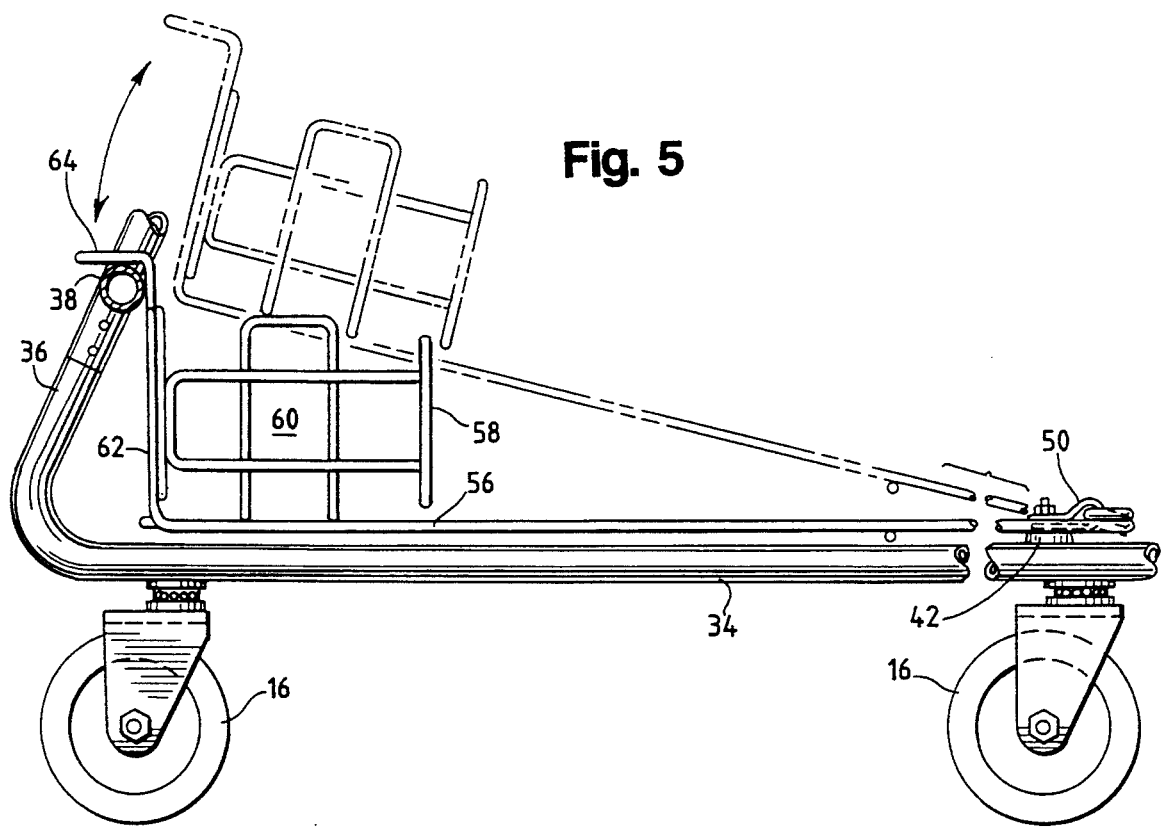

SHOPPING CART HAVING UNDERCARRIAGE TRAY WITH INTEGRAL BASKET

TECHNICAL FIELD OF THE INVENTION

This invention pertains to a shopping cart comprising an undercarriage of a novel construction. The undercarriage has a tiltable tray, which may include a lower, integral basket ideal for holding packages of beverage cans, large bottles, or other heavy or bulky goods. The basket tilts with the tray so as not to interfere with nesting of a similar cart into the shopping cart.

BACKGROUND OF THE INVENTION

Shopping carts are in widespread use in supermarkets, hardware stores, and other similar and dissimilar establishments. Generally, a shopping cart has a chassis or undercarriage, which includes a frame provided with wheeled casters and with a handle, and a large, upper basket, which is supported by an upper portion of the frame. Often, it also has a lower tray supported by a lower portion of the frame, below the main basket. The lower tray is useful to hold goods that are heavy or bulky, such as packages of beverage cans or large bottles.

Commonly, a shopping cart is nestable, which means that a similar cart can nest into the shopping cart. Further, it is common for the lower tray of the shopping cart to be pivotally mounted near a front end of the lower frame of its chassis or undercarriage, so that the lower tray can tilt upwardly so as not to interfere with the lower portion of the frame of the chassis or undercarriage of a similar cart being nested into the shopping cart.

This invention has resulted from efforts to improve a shopping cart having a tiltable tray on its undercarriage, generally as described above, so that the tiltable tray can be better utilized by a shopper.

SUMMARY OF THE INVENTION

This invention provides in a shopping cart, generally as described above, an undercarriage comprising a frame and a tray in a unique arrangement. The frame includes two lateral portions extending longitudinally between the front and back ends of the undercarriage, at a lower level, and a transverse portion extending transversely near the back end of the undercarriage, at a higher level.

At a front portion, the tray is mounted pivotally to the frame, near the front end of the undercarriage, so as to permit the tray to tilt on a transverse axis approximately at the lower level between a generally level position and an upwardly tilted position. A back portion of the tray is disposed to rest against the transverse portion of the frame in the generally level position of the tray and is elevated in the upwardly tilted position of the tray.

Preferably, the tray includes a basket, which is integral with the tray, near a back end of the undercarriage. The integral basket has at least a front panel and a back panel and may have two side panels. The tray and the integral basket may be advantageously formed from welded wires.

In a preferred embodiment, one of the welded wires defines a bail, which extends backwardly so as to overlie the transverse portion of the frame in the generally level position of the tray.

The integral basket is ideal for holding packages of beverage cans, large bottles, or other heavy or bulky goods, which such basket holds in a convenient location for a shopper pushing the shopping cart to reach such goods. There is no need, therefore, for a shopper to place such goods into the main basket of the shopping cart.

These and other objects, features, and advantages of this invention are evident from the following description of a preferred embodiment of this invention with reference to the accompanying drawings.

BRIEF DESCRIPTION OF THE DRAWINGS

FIG. 4 is a fragmentary, plan view of the undercarriage. The tray and the integral basket are shown in a generally level position, in which a back portion of the tray rests against a transverse portion of the frame.

FIG. 5 is a side elevation of the undercarriage. The tray and the integral basket are shown in full lines in the generally level position and in broken lines in an upwardly tilted position, to which the tray and the integral basket are tiltable to permit a similar cart to nest with the shopping cart.

DETAILED DESCRIPTION OF PREFERRED EMBODIMENT

Figure 1:
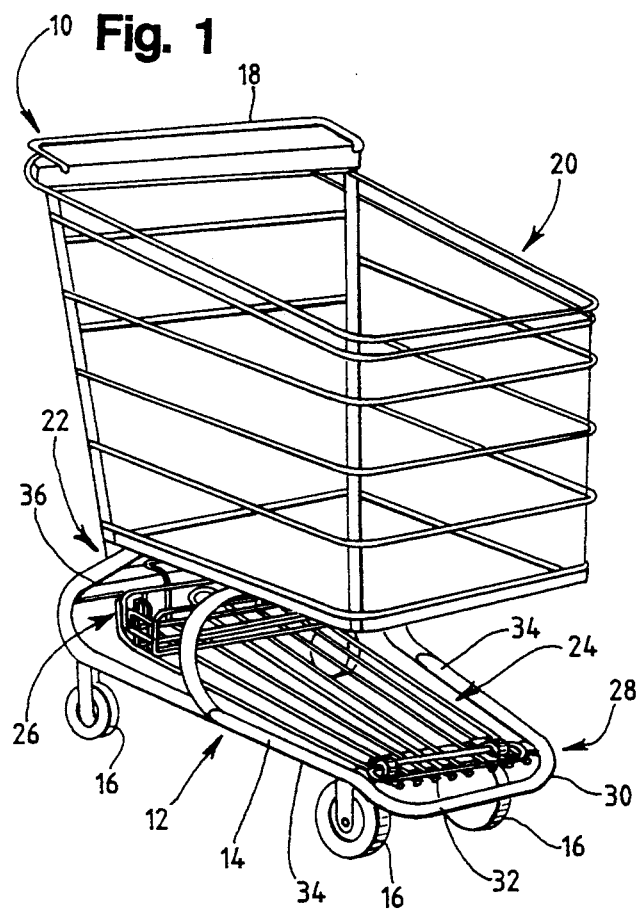
FIG. 1 is a perspective view of a shopping cart embodying this invention.
Figure 3:
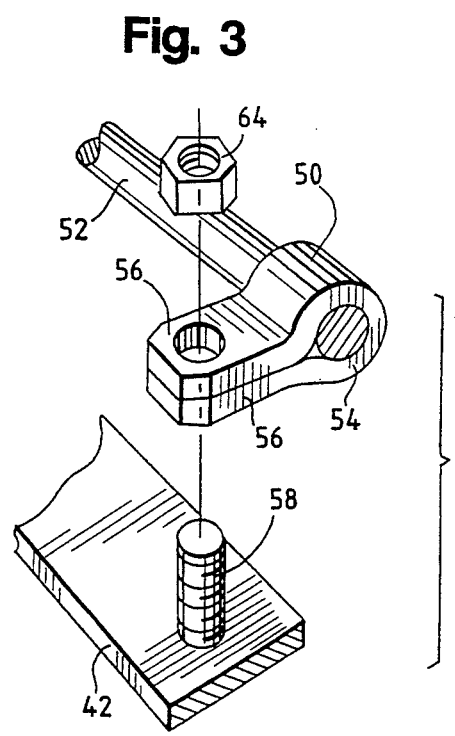
FIG. 3 is an enlarged, fragmentary detail showing one of two hinges used to mount a lower tray with an integral basket pivotally to a frame of the undercarriage, via a transverse member.

As shown in FIG. 1, a shopping cart 10 comprises and constitutes a preferred embodiment of this invention. The shopping cart 10 comprises an undercarriage 12, which includes a frame 14 formed from tubular steel members welded together. The frame 14 is provided with four wheeled casters 16. A tubular steel handle 18 is welded to the frame 14. The shopping cart 10 further comprises a large, upper basket 20, which is formed from welded steel wires, and which is supported by an upper portion 22 of the frame 14. The undercarriage 12 and the basket 20 are flared at their opposite sides, from front to back, as shown.

Moreover, in accordance with this invention, the undercarriage 12 includes a tiltable tray 24, which is flared similarly. The tray 24 is provided with an integral basket 26 and mounted pivotally to a lower portion 28 of the frame 14. The tiltable tray 24 and the integral basket 26 are formed from welded steel wires.

The frame 14, which defines two levels, has a main member 30, which is formed from a steel tube so as to include a front portion 32, two lateral portions 34, and two upright portions 36. The lateral portions 34 adjoin the front portion 32 and extend in generally longitudinal directions, between a front end of the undercarriage 12 and a back end thereof, at a lower level. The upright portions 36 adjoin the lateral portions 34 at the back end of the undercarriage 12 and extend upwardly and forwardly from the lateral portions 34.

The frame 14 also has a transverse member 38 formed from a steel tube and extending transversely between the upright portions 36, near the back end of the undercarriage 12, at a higher level. The frame 14 further has a steel bar 42, which extends transversely between the upright portions 36, near the front end of the undercarriage 12, at the lower level.

The frame 14 also has a bracing member 40, which is welded at its opposite ends to the lateral portions 34 of the frame member 30, at intermediate locations between the front and back ends of the undercarriage 12. The bracing member 40 is shown in FIG. 1 but is omitted in other views to simplify those views. The upper basket 20 is supported fixedly by the upright portions 36 of the frame member 30 and by the bracing member 40, in a conventional manner.

Two transversely spaced hinges 50 are mounted fixedly to the transversely extending bar 42. Each hinge 50 is made from a steel strap, which is formed loosely around a transverse Wire 52 so as to define a hinge loop 54 extending around the wire 52 and two flanges 56 extending backwardly from the hinge loop 54 and pressing against each other. The wire 52, which is one of the welded wires forming the tray 24, extends transversely near the front end of the undercarriage 12.

Each hinge 50 is mounted fixedly to the transversely extending bar 42 by a bolt 58 extending upwardly through a hole 60 in the member 36 and through aligned holes 62 in the flanges 56 and by a nut 64 threaded onto the bolt 58. The hinges 50 permit the tray 24 and the basket 26 to tilt conjointly on the wire 52, between a generally level position and an upwardly tilted position, as shown in FIG. 5.

Some of the welded wires forming the tray 24 define a floor panel 56 of the basket 26. Others of the welded wires define other panels of the basket 26, namely a front panel 58, two side panels 60, and a back panel 62. One of the welded wires forming the back panel 62 defines a bail 64, which extends backwardly so as to overlie the transverse member 36 in the generally level position of the tray 24 and the basket 26.

Figure 2:
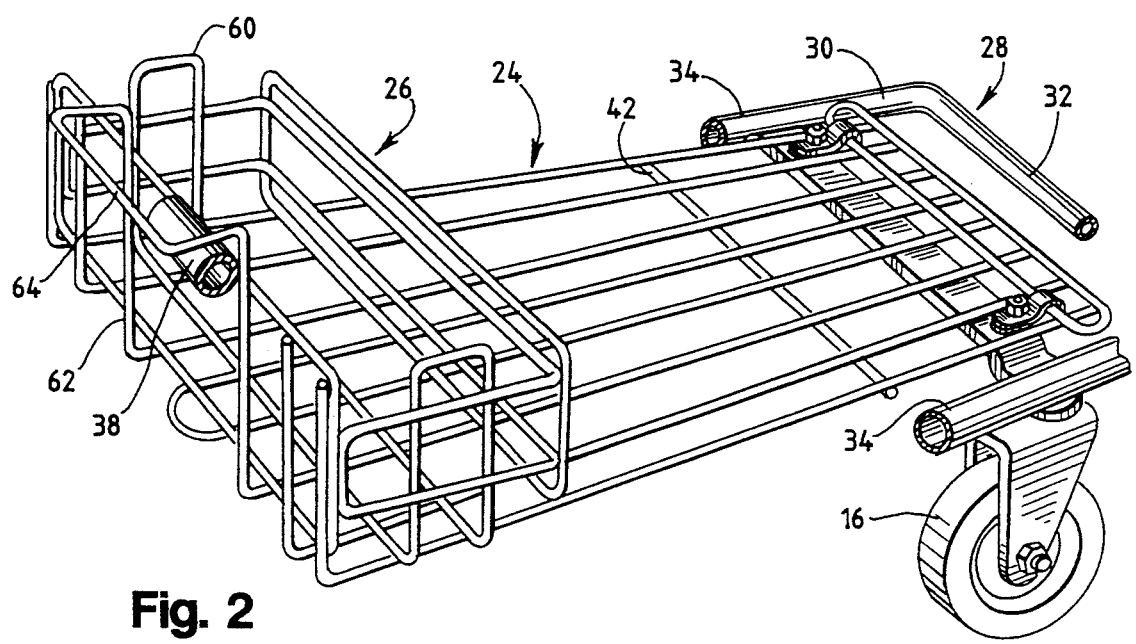
FIG. 2 is a fragmentary, perspective view of an undercarriage of the shopping cart.

As shown in FIG. 2, in the generally level position of the tray 24 and the basket 26, some of the welded wires forming the back panel 62 extend vertically and bear backwardly against the transverse member 36 and the bail 64 bears downwardly against the transverse member 36. Tilting of the tray 24 and the basket 26 conjointly to the upwardly tilted position is limited by contact between the bail 64 and the underside of the upper basket 20.

Various modifications may be made in the preferred embodiment described above without departing from the scope and spirit of this invention.

I claim:

1. A shopping cart comprising an undercarriage, which has a front end and a back end, the undercarriage comprising a frame including two lateral portions extending longitudinally between the front and back ends of the undercarriage, at a lower level, and a straight, transverse portion extending transversely in a horizontal plane, near the back end of the undercarriage, at a higher level, and a tray having a front portion, at which the tray is mounted pivotally to the frame, near the front end of the undercarriage, so as to permit the tray to tilt on a transverse axis approximately at the lower level between a generally level position and an upwardly tilted position to permit nesting of the shopping cart with a similar shopping cart, the tray having a back portion, which extends upwardly and backwardly and is disposed to rest against a middle section of the transverse portion of the frame, between the lateral portions thereof, in the generally level position of the tray, the back portion being elevated in the upwardly tilted position of the tray.

2. The shopping cart of claim 1 wherein the tray includes a basket, which is integral with the back portion and which has a front wall and a back wall.

3. The shopping cart of claim 2 wherein the basket also has two side walls.

4. The shopping cart of claim 3 wherein the tray and the front, back, and side walls of the basket are formed from welded wires.

5. The shopping cart of claim 4 wherein one of the wires defines a bail, which extends upwardly and backwardly so as to overlie the transverse portion of the frame in the generally level position of the tray.

6. A shopping cart comprising an undercarriage, which has a front end and a back end, the undercarriage comprising a frame including two lateral portions extending longitudinally between the front and back ends of the undercarriage, at a lower level, and a straight, transverse portion extending transversely in a horizontal plane, near the back end of the undercarriage, at a higher level, and a tray having a front portion, at which the tray is mounted pivotally to the frame, near the front end of the undercarriage, so as to permit the tray to tilt on a transverse axis approximately at the lower level between a generally level position and an upwardly tilted position, the tray having a back portion and including a basket, which is integral with the back portion and which has walls formed from welded wires, namely a front wall, a back wall, and two side walls, the back wall being disposed to rest against a middle section of the transverse portion of the frame in the generally level position of the tray and being elevated in the upwardly tilted position of the tray, the upwardly tilted position permitting nesting of the shopping cart with a similar shopping cart, one of the wires defining a bail, which extends upwardly and backwardly so as to overlie the transverse portion of the frame, between the lateral portions thereof, in the generally level position of the tray.

* * * * *